United States Patent
Deibele et al.

(10) Patent No.: US 7,435,319 B2
(45) Date of Patent: Oct. 14, 2008

(54) PROCESS FOR THE MILD DISTILLATIVE SEPARATION OF MIXTURES

(75) Inventors: Ludwig Deibele, Köln (DE); Dieter Heinz, Leverkusen (DE); Jan Thomas Leu, Leichlingen (DE); Johannes-Peter Schäfer, Kürten (DE); Kai Fahrenkamp, Leverkusen (DE); Wolfgang Scheinert, Leverkusen (DE); Thomas Schilling, Monheim (DE); Paul Wagner, Düsseldorf (DE)

(73) Assignee: LANXESS Deutschland GmbH, Leverkusen (DE)

( * ) Notice: Subject to any disclaimer, the term of this patent is extended or adjusted under 35 U.S.C. 154(b) by 257 days.

(21) Appl. No.: 10/435,886

(22) Filed: May 12, 2003

(65) Prior Publication Data
US 2004/0020757 A1      Feb. 5, 2004

(30) Foreign Application Priority Data
May 13, 2002   (DE)   ............................. 102 21 122

(51) Int. Cl.
B01D 3/14    (2006.01)
C07C 7/04    (2006.01)
C07C 37/74   (2006.01)
C07C 205/04  (2006.01)

(52) U.S. Cl. ............ 203/98; 203/DIG. 7; 203/DIG. 11; 568/749; 568/934; 585/800

(58) Field of Classification Search ............... 203/98, 203/DIG. 7, DIG. 11, DIG. 18; 568/716, 568/749, 927, 934; 585/800, 803
See application file for complete search history.

(56) References Cited

U.S. PATENT DOCUMENTS

| | | | | |
|---|---|---|---|---|
| 2,939,293 A | * | 6/1960 | Green | 62/628 |
| 3,493,468 A | * | 2/1970 | Arcari | 202/160 |
| 3,666,633 A | * | 5/1972 | Essex et al. | 203/95 |
| 4,362,601 A | * | 12/1982 | Morita | 203/19 |
| 4,568,356 A | * | 2/1986 | Chambers | 44/453 |
| 4,664,755 A | * | 5/1987 | Nienhaus et al. | 203/59 |
| 4,911,793 A | * | 3/1990 | Mueller et al. | 203/92 |
| 5,059,288 A | * | 10/1991 | Curry | 203/43 |
| 5,223,101 A | | 6/1993 | Yeary | 203/4 |
| 5,268,073 A | * | 12/1993 | Casper et al. | 159/47.1 |

(Continued)

FOREIGN PATENT DOCUMENTS

CA      2101461      2/1994

(Continued)

OTHER PUBLICATIONS

Maczynski and Maczynska (Przemysl Chemiczny 49/10, (Month unavailable) 1970, pp. 599-601 "Rektyfikacja ciagla na kolumnie periodycznej".

(Continued)

*Primary Examiner*—Virginia Manoharan
(74) *Attorney, Agent, or Firm*—Nicanor A. Kohncke

(57) ABSTRACT

The invention relates to a semibatchwise process for the mild distillative separation of mixtures, in a first stage a column being supplied continuously with a feed and the feed being separated at least into different fractions, one of the fractions being removed continuously into a container, and, in a second step, the fraction removed into the container being recycled to the column and being separated again batchwise into different fractions.

3 Claims, 2 Drawing Sheets

U.S. PATENT DOCUMENTS

| | | | |
|---|---|---|---|
| 5,374,767 A * | 12/1994 | Drinkard et al. | 560/193 |
| 5,705,039 A | 1/1998 | Clark et al. | 203/75 |
| 6,066,232 A * | 5/2000 | Mohr et al. | 159/13.3 |
| 6,485,613 B1 * | 11/2002 | Goorden | 202/158 |
| 6,982,026 B2 * | 1/2006 | Cockrem et al. | 203/2 |

FOREIGN PATENT DOCUMENTS

| | | |
|---|---|---|
| DE | 4226905 A1 | 2/1994 |
| EP | 638 345 | 4/2001 |

OTHER PUBLICATIONS cf. Kaibel, Krug, Chemie Ingenieur Technik [Chemical Engineering] 70, (month unavailable) 1998, pp. 711-713 "Abwärtsfahrweise und Zwischenspeicherung bei der diskontinuierlichen Destillation".

\* cited by examiner

PROCESS FOR THE MILD DISTILLATIVE SEPARATION OF MIXTURES

BACKGROUND OF THE INVENTION

1. Field of the Invention

The invention relates to a semibatchwise process for the mild distillative separation of mixtures.

2. Brief Description of the Prior Art

Continuous separation processes using a column and batchwise separation processes by means of a distillation bulb with attached column are known. Said processes are described in the form of a synopsis, for example in "Thermische Trennverfahren" [Thermal separation processes] (K. Sattler, 2001 edition, VCH Verlagsgesellschaft, Weinheim).

In batchwise separation processes, which are frequently used for the separation of two, in particular more than two components, a distillation bulb is first filled with the mixture to be separated and heated to the boiling point. The fractions can then be taken off in ascending order of their boiling point via the top of the column, with the bottom temperature simultaneously increasing. This procedure proves to be disadvantageous particularly when, because of its boiling point, a component is not taken off as the first fraction and tends to undergo secondary reaction, such as, for example, decomposition, under prolonged thermal load.

In the case of demanding requirements with respect to the purity of these higher-boiling components, it is possible to take off intermediate cuts of lower purity. These are then added to the feed, for example in the next separation. Consequently, a part of the feed is circulated, with the result that the space-time yields decrease considerably. A further disadvantage of the batchwise procedure is the substantially higher specific energy demand in comparison with the continuous procedure (cf. Kaibel, Krug, Chemie Ingenieur Technik [Chemical Engineering] 70, 1998, pages 711-713).

German Offenlegungsschrift 42 26 905 describes a batchwise distillation, with a part-fraction being taken off in a side stream and being recycled into the columns later on. In this way, the specific energy demand is slightly reduced. However, a disadvantage thereof is that the process control is substantially more complicated and an additional container is required for intermediate storage. Furthermore, in this process, the bottom container is initially filled and higher-boiling components are subjected to thermal load during the entire distillation time in the boiling liquid bottom product.

EP-A 638 345 describes a column having a container at the bottom and at the top, which can be used as a rectification or stripping section depending on the desired procedure. For mixtures whose medium boiler fraction accounts for a proportion of at least 70% by weight, the distillation time can be reduced by this procedure. However, this process requires complicated apparatus and cannot generally be used.

Baichun and Zhicai (Huagong Gongcheng, 22, 1994, pages 30-34) describe the separation of a multicomponent system in a column having two containers. A complete non-steady-state process of a batchwise mode of operation is divided into n-1 continuous steps in order to separate the mixture having n fractions. A container is required as a feed container and a second one is required in order to receive the bottom discharge. This procedure permits the simultaneous use of the column as a stripping and rectification section and hence an acceptable specific energy consumption. However, an additional container is required for this process too.

Maczynski and Maczynska (Przemysl Chemiczny 49, 1970, pages 599-601) propose, for the separation of a binary mixture, a process which combines the advantages of the continuous procedure and the batchwise procedure. In a first step, the column at whose lower end a distillation bulb is present is supplied with a continuous feed and the first fraction is taken off via the top of the column. The bottom discharge is used for filling the distillation bulb. In this process too, the content of the distillation bulb must be kept at the boiling point, and the thermal loading of the higher-boiling components is therefore very high.

There is therefore the need to provide a process for the distillative separation of mixtures which has an advantageous specific energy demand, keeps the complexity of the apparatus manageable and keeps the thermal loading of sensitive components small. Furthermore, an improvement for mixtures of any desired composition should be achievable.

SUMMARY OF THE INVENTION

A process for the distillative separation of mixtures has now been found which is characterized in that a) a column is continuously supplied with a feed and the feed is separated at least into a low boiler fraction and a high boiler fraction and optionally a medium boiler fraction, one of the fractions being removed continuously into a container, and b) after stopping of the continuous feed, the fraction removed in step a) into the container is recycled to the column and is separated again batchwise, in any desired arrangement of boiler and column, at least into a low boiler fraction and a high boiler fraction and optionally a medium boiler fraction.

The invention also relates to a process in which the steps a) and b) are repeated once or several times.

The term "continuously" includes changes of the amount of feed as a function of time as well as temporary interruptions of the feed, as are realized, for example, in the case of an intermittent or stepped feed or a feed changing over a predetermined ramp.

It should be pointed out that the scope of the invention, as more fullydescribed hereunder, also comprises any desired combinations of features and preferred ranges thereof.

DETAILED DESCRIPTION OF THE INVENTION

Figure 1:
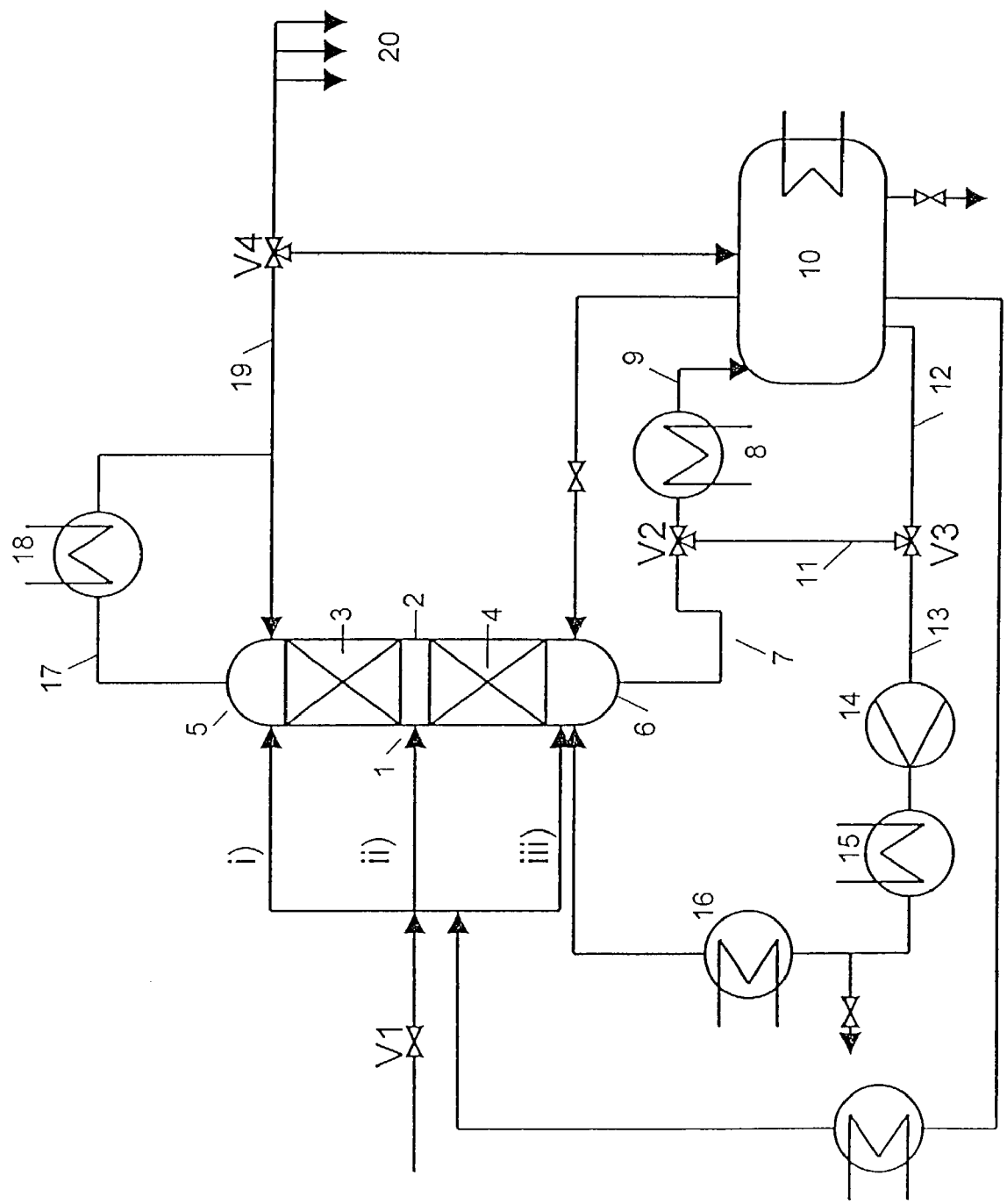
FIG. 1 is a schematic of the process of separating mixtures, representing: feeding the mixture into the column and separating it fractions, removing the respective fraction into a container and recycling the fraction removed after stopping the feed, and in the alternative recycling the middle and highest boiling fractions.

According to the separation problem and depending on the position of the feed point, the column serves either as a stripping column (FIG. 1, feed i), i.e. all theoretical plates are below the feed point ($n_A$=n), as a rectification column (FIG. 1, feed iii), i.e. all theoretical plates are above the feed point ($n_A$=0), or as a column having a stripping section and rectification section (FIG. 1, feed ii), i.e. $n_A$ theoretical plates are below and n-$n_A$ theoretical plates are above the feed point, n being the total number of theoretical plates of the column.

The feed point is preferably chosen so that the column has a stripping section and a rectification section.

The columns used may be the columns known to a person skilled in the art. For example, these are packed columns containing dumped packings or stacked packings or tray columns. If it is intended to take off side stream fractions (medium boiler fractions), the column may also be designed as a dividing wall column or thermally coupled column.

Furthermore, it is also possible to equip the column both with trays and with packing elements. For example, packings may be used in the rectification section and trays in the stripping section.

Preferably, packed columns containing dumped packings or stacked packings and corresponding tray constructions in tray columns are suitable for minimizing the hold-up and pressure drop for mild thermal separation.

The trays, dumped packings and stacked packings which can be used for the process according to the invention are described, for example, in Henry Kister, Distillation Design, McGrawHill, 1992, K. Sattler, Thermische Trenntechnik [Thermal Separation Technology], Verlag VCH, 2001.

The number of theoretical plates in the column may be, for example, from 2 to 150, preferably from 4 to 70, particularly preferably from 6 to 60.

For example, a part of the mixture to be separated or a fraction thereof which may originate, for example, from a prior separation can be used for starting up the column before step a). In a preferred embodiment, the bottom of the column is filled with just sufficient liquid to enable the evaporator to be put into operation.

Furthermore, it is preferable to start up the column with a high boiler fraction of the mixture to be separated, in order to keep the content of low boilers in the bottom of the column as low as possible from the outset.

The terms "high boilers" and "high boiler fractions" are to be understood as meaning substances or mixtures which have a higher boiling point than the optionally present medium boilers and medium boiler fractions, which in turn have a higher boiling point than the low boilers and low boiler fractions. The terms in each case relate to a partial step and may have a different meaning for step a) and step b) for an individual substance. Thus, for example, a high boiler from step a) may be a low boiler in step b).

In the distillative separation of the feed, the feed is separated at least into a low boiler fraction and a high boiler fraction and optionally a medium boiler fraction, one of the fractions being removed continuously into a container.

Preferably, in step a), at least one low boiler fraction is removed via the top column and at least one high boiler fraction via the bottom of the column.

Furthermore preferably, in step a), a low boiler fraction is removed via the top of the column (also referred to as top fraction), a medium boiler fraction via a side stream (also referred to as side stream fraction) and a high boiler fraction via the bottom of the column (also referred to as bottom fraction).

Particularly when the column is used as a rectification and stripping section during step a), it is also possible to obtain medium boiler fractions which meet very high purity requirements without intermediate steps. Particularly preferably, in step a), a low boiler fraction is taken off via the top of the column and a high boiler fraction via the bottom of the column.

Either a top fraction, optionally a medium boiler fraction or a bottom fraction can be transferred into the container, preferably the top fraction or the bottom fraction.

Preferably, the fraction whose purity requirements are not met in the continuous step is removed into the container.

The removal into the container is effected continuously, the term continuously being defined as above.

In the case of thermally sensitive products, the fraction which is removed into the container can remain at a temperature which, based on the pressure in the bottom of the column, is below its boiling point, and is therefore subjected to considerably less thermal load, for example in comparison with the batchwise distillation.

The removal and the residence in the container are preferably effected without additional heat supply or with cooling. The residence temperature can be chosen according to the product properties.

All customary control concepts and control concepts mentioned, for example, by Kister, Sattler and Stichlmair (Distillation—Principles and Practice, Wiley VCH, 1998) for the continuous and batchwise columns can be used for automating the process according to the invention. In a preferred embodiment of the process according to the invention, in step a) the control is effected via suitable temperature measurements in the rectification and/or stripping section, depending on the desired target purity of the top or bottom product.

Once the container is at least partly full, step a) is terminated by stopping the feed and in step b) the content of the container is fed to the column. In step b), the column can be operated either by the descending, ascending or simultaneously descending and ascending procedure. The freedom of arrangement in step b) means that the column is not connected directly to the boiler but preferably via a pipeline with a liquid seal, for example also with a shut-off means.

In the descending procedure, the container is connected to the condensate discharge and the container discharge passes as a reflux to the top of the column. The fractions are taken off as high boiler fractions at the bottom, until finally the last low boiler fraction remains in the container in the desired purity.

In step b), the mixture is preferably separated batchwise by the ascending procedure. The container is then integrated into the bottom circulation, the liquid from the bottom being recycled via the container and the evaporator into the column. One or more low boiler fractions can be taken off via the top until the last high boiler fraction of the desired purity is in the container. It may also be the distillation residue.

The simultaneous ascending and descending procedure in step b) can be realized by connection of the container in the middle of the column. Low boiler fractions are taken off at the top and also high boiler fractions at the bottom. This embodiment of step b) is then advantageously completed when a medium boiler fraction—or alternatively an intermediate cut—remains in the desired purity/composition in the container. The batch distillation with a middle container is described, for example, in M. Warter et al., Comp. Chem. Eng. Suppl. (1999), page 915-page 918.

For steps a) and b), heating with live steam is also possible. In the ascending procedure, the evaporation can be effected from the container. In the preferred case, however, the container can be operated at a temperature below the boiling point, for the mild treatment of the feedstocks. For the process according to the invention, it is therefore preferable to use an evaporator. Evaporators which may be used are all evaporator types which are known to a person skilled in the art, require a small temperature increase and permit evaporation from thin films. Falling-film evaporators or thin-film evaporators are preferably used. Optionally, one or more preheaters can be connected upstream of the evaporator.

The invention also relates to a process in which the steps a) and b), in each case independently of one another, are repeated once or several times.

The process according to the invention is particularly suitable for the separation of multicomponent mixtures. Examples of multicomponent mixtures are reaction mixtures or solvent mixtures.

Figure 2:
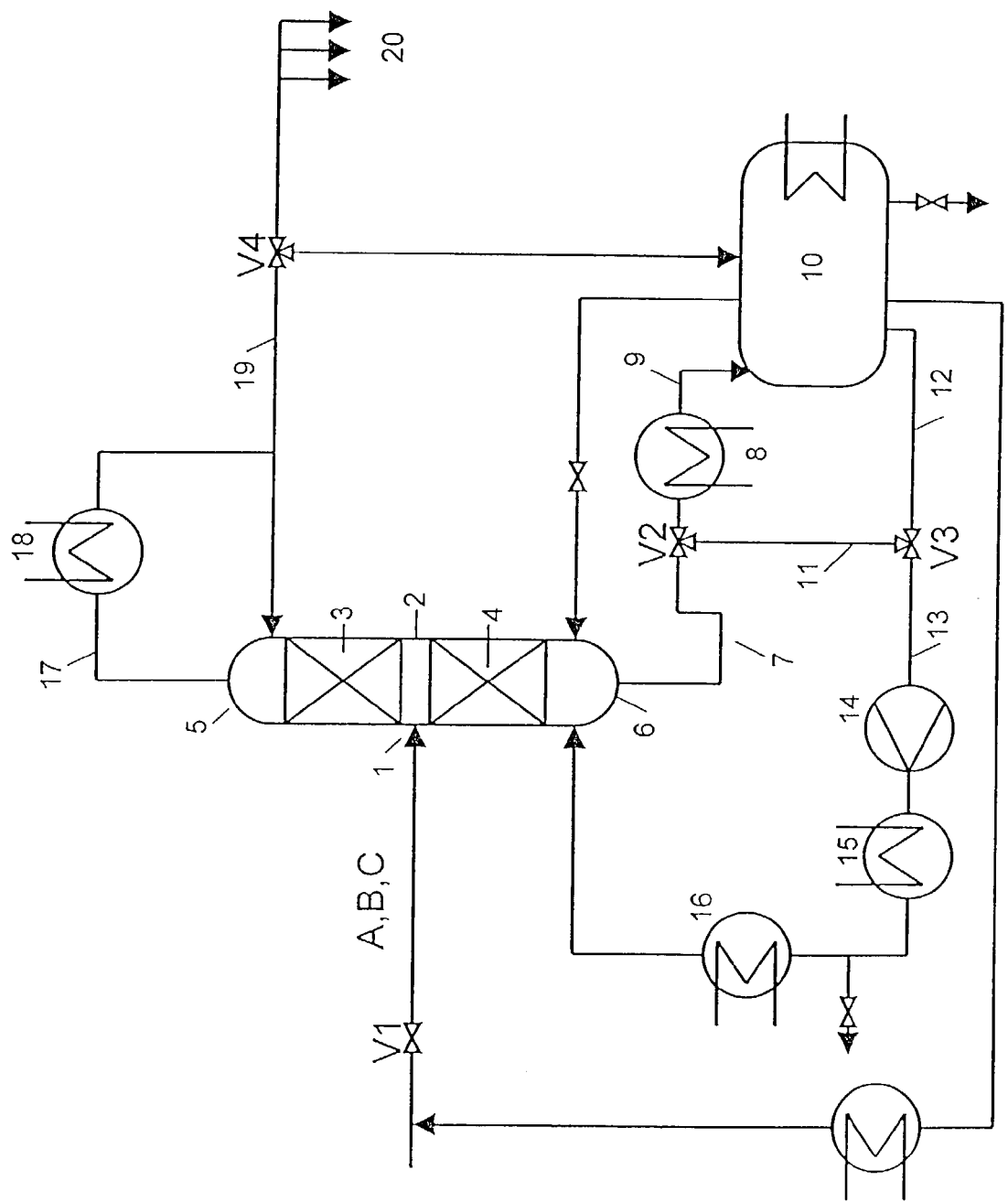
FIG. 2 is a schematic of a distillation apparatus for separating mixtures in accordance with the invention.

The process according to the invention is further described by way of the following non-limiting example with reference to FIGS. 1 and 2:

Step a)

The column 2 is fed continuously with a mixture which is to be separated and comprises the components A (lowest boiling point), B (middle boiling point) and C (highest boiling point) via a feed valve V1 and the feed 1, which is located either in the upper (i), in the middle (ii) or in the lower part of the column. When the column 2 is fed via the middle part (ii), as shown in FIG. 2, the column 2 is consequently divided for step a) into a stripping section 4 and a rectification section 3. Component A is taken off via the top 5 of the column and the components B and C are at least partly removed via the bottom 6 of the column and via the lines 7 and 9 and the valve (V2) connected in between and the heat exchanger 9 into a container 10. When a predetermined level is reached in container 10, the feed valve V1 is closed. The container 10 is now connected to the bottom circulation (bottom 6 of the column => lines 7, 9 and 11, valves V2 and V3 => container 10 => line 13, pump 14, preheater 15, evaporator 16 => and bottom 6 of the column). At the top 5 of the column, the low boiler of the mixture B is taken off in the desired purity via the line 19 into a collecting apparatus 20. The high boiler C is concentrated in the bottom. The step is complete when C has reached the desired target purity. Alternatively, the components B and C can also be recycled via feed 1 to the column 2, component B via the top 5 of the column and component C via the bottom 6 of the column, but then into a separate product container.

The invention also relates to a process in which steps a) and b), in each case independently of one another, are repeated once or several times.

The process according to the invention is particularly suitable for the separation of multicomponent mixtures. Examples of multicomponent mixtures are reaction mixtures or solvent mixtures.

The invention furthermore relates to a distillation apparatus consisting at least of a column 2 from whose upper part 5 a discharge line 17 leads via a heat exchanger 18 and a line 19 to a valve V4, the line 19 being connected to the column, and furthermore leads to at least one collecting apparatus 20, a feed 1 which is controllable via a feed valve V1 and enters the column, and a thermostatable container 10 which is spatially separated from the column and is connected to the column via the lines 7 and 9, which is characterized in that the line 7 leads to a valve V2 which is connected via the line 9, which optionally leads via a heat exchanger 8, to the container 10 and via the line 11 to the valve V3, the valve V3 being connected via the line 12 to the container and via the line 13 to the column, and the line 13 furthermore containing a pump 14, optionally a preheater 15 and optionally an evaporator 16, and furthermore the line 19 mounted at the upper end of the column 2 contains a valve V4 which connects the column 2 via the line 19 and the line 21 to the container 10.

The present invention is distinguished by the fact that the entire process can be carried out using apparatus which is not very complicated. In particular mixtures comprising thermally sensitive fractions can be separated under mild conditions with very good space-time yields.

EXAMPLES

Example 1

A mixture consisting of:
100 kg of n-hexane
700 kg of n-heptane
200 kg of n-octane was separated without an intermediate cut, the purity in each case being at least 99.0%.

For this purpose, a column having twenty theoretical plates were used under the following conditions:

| | |
|---|---|
| Top pressure $p_{Top}$ = | 1 bar |
| Pressure drop $\Delta p$ = | 1 mbar/plate |
| Energy supply (Q) = | constant 50 kW |

The separation was carried out batchwise from a distillation bulb with attached column (I) and according to the invention (II). Comparisons were based on simulation calculations, but on the basis of a measured material system and with a validated column model.

The following procedure was adopted and the times in brackets determined:
(I) Not according to the invention (cf EP-A 638 345):
  Initially introduced mixture in the boiler
  Distillation of n-hexane via the top of the column (350 min)
  Distillation of n-heptane (150 min) as second fraction via the top of the column
  n-Octane remained as a bottom residue.
  Total distillation time: 500 min.
(II) According to the invention:
  Step a): continuous feeding of the column with the mixture and take-off of n-hexane as a top product with simultaneous filling of the container with n-heptane/n-octane (150 min), followed by feeding of the column from the container and separation of n-heptane (150 min) via the top of the column, n-octane remaining as a bottom residue.
  Total distillation time: 300 min Example 2

The reaction of phenol and ethylene oxide gives a mixture which contains 94% of phenoxyethanol. The remaining 6% substantially comprise high boilers and unconverted phenol. This mixture was worked up according to the invention as follows (substantially corresponds to the exemplary explanations for FIGS. 1 and 2).

The column 2 was in the form of a column containing stacked packing and was heated by means of a falling-film evaporator 15. The column 2 is heated with bottom product from the last batch or phenol-free phenoxyethanol, which is initially introduced into the container 10, via the falling-film evaporator 15 and is initially operated with total reflux. The amount of product used for this purpose is only a fraction of the container volume and is chosen so that the column 2 can just be started up therewith. After the temperature profile in the column has stabilized, the column was fed continuously with a gradually increasing and finally constant stream of the reaction mixture described above.

The feed point was chosen so that the column 2 had both a stripping section and a rectification section (ii).

In this way, the phenol contents of about 10 ppm were achieved in the bottom.

Under reflux conditions and an absolute pressure of 30 mbar, a temperature of 130° C. was established at the top of the column 5 and a temperature of 155° C. at the bottom. At a pressure difference regulated to 18 mbar, the pressure at the top of the column was kept at from 30 to 40 mbar. During step a), a forerun, whose phenol content is checked, is taken off via the top of the column.

The bottom discharge of bottom 6 of the column is passed into the container 10. When the container was filled to its maximum level, the feed was stopped by changing over feed valve V1 and step b) was immediately started and a further forerun taken off. The phenol content in the forerun decreased, and changeover to the main fraction was effected on falling below a certain phenol content dependent on the quality requirements for the main fraction. The main fraction was taken off until a temperature of 157° C. was reached at the bottom of the column, and changeover to total reflux was then effected. The apparatus was then ready for receiving the next batch. After six batches, the bottom product collected in the distillation bulb was discharged after a fraction containing phenoxyethanol and higher homologs have been separated off in last runnings by rectification.

Example 3

In step a), the column 2 was fed continuously with a reaction mixture from the nitration of ethylbenzene, which reaction mixture substantially contains ortho- and para-nitroethylbenzene (o-NEB and p-NEB, respectively) and about 7% of meta-nitroethylbenzene (m-NEB) and 0.5% of dinitroethylbenzene (di-NEB). The mixture freed from di-NEB and comprising o-NEB, p-NEB and m-NEB was taken off via the top 5 of the column and removed into the container 10. A fraction which contained about 10% by mass of di-NEB was taken off via the bottom 6 of the column.

In step b), the column 2 was fed from the container 10 with the mixture obtained in step a) and comprising o-NEB, p-NEB and m-NEB. The fractions forerun, o-NEB, intermediate cut I and intermediate cut II were taken off in succession via the top 5 of the column. Since di-NEB and other high boilers had already been removed in step a), pure p-NEB was present in the bottom. Optionally distillation of last runnings with take-off of pure p-NEB via the top follows. By means of this procedure, it was possible to reduce the residence time of the thermally sensitive di-NEB at high temperatures to about 6 h compared with about 150 h in the conventional batchwise distillation with a column attached to the distillation bulb.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the distillative separation of a mixture consisting of n-hexane, n-heptane and n-octane, comprising:
   a) continuously supplying a column with a feed of said mixture, removing n-hexane as a top product and, simultaneously, removing n-heptane and n-octane into a container; and
   b) stopping the feed, recycling the n-heptane and n-octane fraction, removed in step a) into the container, to the column, separating n-heptane via the top of the column, wherein n-octane remains as a bottom residue.

2. A process for the distillative separation of a product mixture of the reaction of phenol and ethylene oxide containing phenoxyethanol, a high boiler, and unconverted phenol, comprising:
   a) continuously supplying a column with a feed of said mixture, separating the feed into fractions containing at least a low boiler fraction comprising phenol and a high boiler fraction said high boiler comprising phenoxyethanol, removing the high boiler fraction continuously into a container; and
   b) stopping the feed, recycling the high boiler fraction, removed in step a) into the container, to the column, separating the high boiler traction at least into a further low boiler fraction and a further high boiler fraction in step b) and using the further high boiler fraction of step (b) for starting up the column in step a).

3. A process for the distillative separation of a reaction mixture from the nitration of ethylbenzene containing ortho- and para-nitroethylbenzene, meta-nitroethylbenzene, and dinitroethylbenzene, comprising:
   a) continuously supplying a column with a feed of said mixture, separating the feed into fractions containing at least a fraction comprising ortho-, para- and meta-nitroethylbenzene and a fraction comprising dinitroethylbenzene, removing the fraction comprising ortho-, para- and meta-nitroethylbenzene continuously into a container; and
   b) stopping the feed, recycling the fraction comprising ortho-, para- and meta-nitroethylbenzene, removed in step a) into the container, to the column; separating the fraction comprising ortho-, para- and meta-nitroethylbenzene into at least a further low boiler traction and a further high boiler fraction, wherein the high boiler fraction comprises purified para-nitroethylbenzene.

* * * * *